United States Patent
Navarro et al.

(10) Patent No.: US 11,853,257 B1
(45) Date of Patent: Dec. 26, 2023

(54) SYNTHETIC CONTENT MODEL VERIFICATION

(71) Applicant: Amazon Technologies, Inc., Seattle, WA (US)

(72) Inventors: Jaime Alberto Navarro, Hoboken, NJ (US); Warren Bennett, Jersey City, NJ (US); Sean Piersanti, Rahway, NJ (US)

(73) Assignee: Amazon Technologies, Inc., Seattle, WA (US)

( * ) Notice: Subject to any disclaimer, the term of this patent is extended or adjusted under 35 U.S.C. 154(b) by 661 days.

(21) Appl. No.: 16/577,542

(22) Filed: Sep. 20, 2019

(51) Int. Cl.
*G06F 16/11* (2019.01)
*G06F 9/54* (2006.01)

(52) U.S. Cl.
CPC ............ *G06F 16/122* (2019.01); *G06F 9/541* (2013.01)

(58) Field of Classification Search
CPC ................................ G06F 16/122; G06F 9/541
See application file for complete search history.

(56) References Cited

U.S. PATENT DOCUMENTS

| | | | |
|---|---|---|---|
| 7,451,352 B1* | 11/2008 | Moore ................ | G06F 11/0751 714/38.14 |
| 9,558,445 B1* | 1/2017 | Rabe ..................... | H04L 63/123 |
| 10,282,757 B1* | 5/2019 | Bitoun ............... | G06Q 30/0251 |
| 2003/0212740 A1* | 11/2003 | Berrigan ............... | G06F 40/226 709/237 |
| 2005/0198154 A1* | 9/2005 | Xie ......................... | H04L 67/56 709/206 |
| 2006/0230032 A1* | 10/2006 | Brankov ............... | G06F 16/972 |
| 2011/0185282 A1* | 7/2011 | Mahmood ........... | G06F 11/0754 715/744 |
| 2013/0086102 A1* | 4/2013 | Addala ................ | G06F 16/958 707/769 |
| 2016/0171245 A1* | 6/2016 | Bura ..................... | G06Q 10/10 726/17 |

* cited by examiner

*Primary Examiner* — Jensen Hu
(74) *Attorney, Agent, or Firm* — Eversheds Sutherland (US) LLP

(57) ABSTRACT

Devices, systems, and methods are provided for using a synthetic content model verification. A system may receive, at a front end service, inputs of a content campaign. The system may determine, based on the inputs, validation criterion. The system may determine, by the front end service, that a first input satisfies first validation criteria, and may send the inputs to a back end service. The system may receive, by the front end service from the back end service, a first indication that a second input fails to satisfy second validation criteria. The system may receive, at the front end service, a third input replacing the second input. The system may send, by the front end service to the back end service, the third input, and may receive, by the front end service from the back end service, a second indication that the third input satisfies the second validation criteria.

20 Claims, 6 Drawing Sheets

SYNTHETIC CONTENT MODEL VERIFICATION

BACKGROUND

Content generation processes are increasingly using more rules, thereby requiring different verifications. When a device sends information with which to generate content, multiple verification services may evaluate the information for compliance with different respective rules. The use of multiple such verification systems may require significant time and processing resources, and may result in inconsistent validation using conflicting rules, in which one system may validate a content generation request, and another system may invalidate the same content generation request. Content generation verification may benefit from improved content generation processes.

Figure 1:
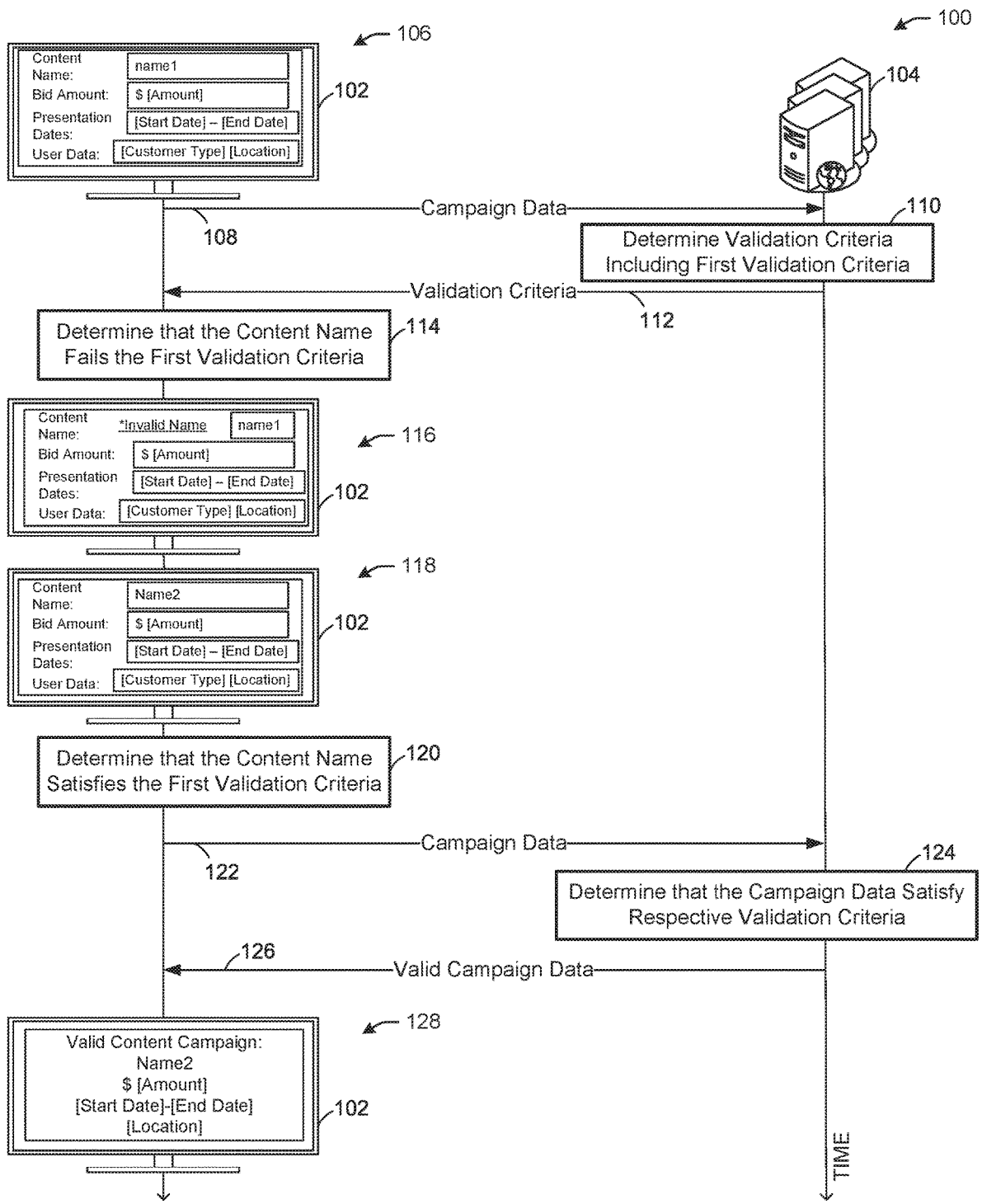
FIG. 1 illustrates an example process for using a synthetic content model verification in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for using a synthetic content model verification.

When a user provides inputs and other data for generating a content campaign, such as an ad campaign or other campaign in which content is generated, multiple systems on the front end (e.g., client device side) and/or back end (e.g., client side) may be used to determine whether the inputs satisfy validation rules. For example, an input may include a name for the content (e.g., for the ad campaign), and a validation rule may require that no other content shares that name. When a validation system identifies other content with the same name, a content request with the already-used name may be rejected (e.g., the system may not allow for more content under the name to be generated). Other rules may require a minimum number of dates during which the content is to be presented, a minimum number of keywords to be identified from the content, whether the name begins with a capital letter and has a minimum number of characters, whether a budget for the content will be satisfied based on budget inputs, whether a bid for presenting the content will be within a budget constraint, and the like.

Some content validation systems may rely on a client device receiving data (e.g., parameters input by a user into the client device) and providing the data to a server (e.g., a back end validation service). The back end validation service may validate any of the data before responding to a request associated with the data, such as a request to generate a content campaign using the parameters input at a client device.

Some user interfaces may allow for front end validation of inputs. However, to validate content campaign data using a combination of a front end and a back end of a single validation service may require coordination between the front end and the back end. In particular, when a front end validation process relies on validation rules conflicting with validation rules relied on by a back end of the validation process, the parameters of a content campaign may be validated (e.g., satisfy one or more criteria) on one end, but invalidated on the other end. In addition, the validation criteria used at the front end and back end of a validation service may vary. For example, a minimum bid for a content campaign in one country may differ from a minimum bid for a content campaign in another country. Thus, front end validation may require coordination with back end validation to determine the validation criteria to use in validating content campaign data.

The front end of the validation service may have to send all inputs or other data for the content campaign to the back end so that the back end may validate any of the inputs or other data. When the back end determines that one or more inputs or other data do not satisfy a respective criteria, the back end may have to communicate the invalidity to the front end so that the front end may prompt a user to modify the inputs or other data. Such back-and-forth communications between the front end and the back end may be inefficient. In addition, coordination between the front end and back end of a validation service to determine validation criteria may include one or more exchanges between the front end and the back end (e.g., exchanges between a client device and one or more servers). Thus, validation services using a front end and a back end validation process with varying validation criteria may benefit from an improved process.

For example, a front end validation service may verify whether a content name input meets a minimum and/or maximum length, and when the name requirement is verified, the front end (e.g., a user interface presented at a user device) may send a request to a verification service on the back end (e.g., server side), where a back end service may verify that the content name does not already exist for other content. The result of the verification (e.g., pass, fail, yes, no, valid, invalid, etc.) may be communicated by the back end to the front end, wherein the result may be used in further verification and/or displayed on the device front end. Some inputs may be validated on the front end and may not need back end validation (e.g., a content name length).

The verification systems for inputs of a request to generate content may be customized. Some inputs may be validated on the front end and/or on the back end. In some examples, the back end validation may include a subset of criteria or rules of the front end criteria or rules. Once inputs are validated on the front end, some of the inputs may be validated on the back end to ensure that no data tampering has occurred, for example.

The rules and criteria for validation services may vary based on the type of content and the specified location where the content is to be presented. For example, content presented in one country may use different budget rules than content presented in another country. Thus, content generation inputs may satisfy criteria of some validation systems and may fail criteria of other validation systems.

Content generation inputs, such as ad campaign parameters, may be uploaded in a payload of a JSON file or other type of file or tool. The JSON or other file with the inputs may be uploaded using an application programming interface (API) provided by a validation service on the back end. The payload of an API call made through the API may include the JSON or other file, and therefore may include the inputs for content generation. A validation service may read the payload of an API call and identify the inputs as content generation parameters, and may compare the inputs to rules and criteria to determine whether any of the inputs fail to satisfy respective criteria.

Some existing methods of validation may require analysis of content inputs by multiple validation services and may provide feedback (e.g., whether the inputs satisfy all the criteria) only after all of the inputs have been compared to respective criteria. Such can be time consuming and inefficient. For example, if criteria such as a content name limitation is not satisfied, using the extra time and processing resources to validate other subsequent inputs may be wasteful when the content cannot be generated due to the failure of the inputs to meet the name criteria. Some systems may perform all front end validations before sending inputs to the back end rather than allowing inputs validated on the front end to be sent to the back end while a user modifies invalid inputs on the front end.

For example, some content generation services may be launched with front end validation for any user interface field (e.g., fields of a user interface presented at a user device) being validated, and a back end validation service may be executed as a separate review that may be triggered by a user selecting "submit" or some other input selection using the user interface. The back end validation service may complement the front end validation service for a content generation service, and the back end service may evaluate a subset of the inputs validated by the front end service (e.g., verifying that a submitted budget input>a bid amount input). However, an input may be validated by the front end service, but not by the back end service, and not all validation services are aware of similar validation services with the same or similar rules or criteria for validation. The divergence of validation decisions by different validation services may result in users receiving messages to modify inputs when the user may be presented with other messages indicating that the inputs are valid, or in users not having the opportunity to modify the content inputs when a validation failure occurs.

Therefore, user experience and system efficiencies may be improved by a unified set of content generation validation rules implemented by a single validation service.

In one or more embodiments, rather than having multiple front end and back end system validations performed on one set of content generation inputs, a single unified system may validate the inputs and notify other validation systems of the inputs. The unified system may provide users with opportunities to modify inputs that are invalid (e.g., do not meet criteria), and may evaluate and allow input modifications in real time. Real-time front-end evaluation of inputs and other data related to a content campaign may allow for a front end validation service to verify that any inputs or other data that may be validated on the front end are validated on the front end before sending the inputs or other data to the back end. In this manner, the number of communications between the front end and the back end may be reduced.

In one or more embodiments, the unified system may use front end validation and back end validation, or may skip front end validation by sending all data inputs for content generation to the back end for server side validation. To avoid the back-and-forth calls between the front end and back end to determine and confirm that the content generation inputs are valid, the inputs may be evaluated in real time. For example, the front end may determine that data input for any criteria (e.g., name, bid amount, presentation dates, etc.) is valid or invalid while the user is inputting other data. In this manner, the front end does not need to send to the back end all of the inputs, and the back end does not need to respond with a valid or invalid indication for the entire set of inputs. Instead, the front end may indicate an invalid input before sending the input to the back end, or may send the input to the back end while the user is still inputting other criteria for content generation via a user interface (e.g., the data inputted into the user interface may be sent in an API payload to the back end for further evaluation).

In one or more embodiments, the unified system may determine validation criteria for the front end and the back end based on variables such as a type of user requesting the content campaign, a location of the requesting user, a location where the content campaign is to be presented, and other data related to the content campaign or the requesting user. For example, the front end may validate whether a minimum bid amount is satisfied before the bid amount received at the front end is sent to the back end with any other inputs or relevant campaign data. For the front end to apply the minimum bid amount criteria, the front end and the back end of the validation service may coordinate to determine which validation criteria to apply. For example, when a content campaign location is in one country, the front end minimum bid amount validation criteria (e.g., a minimum bid threshold) may be different than the front end minimum bid amount validation criteria for a content campaign in another country. In this manner, the front end may send the inputs and other campaign data to the back end, which may identify the validation criteria (e.g., a data schema) applicable to the country identified by an input. Accordingly, the validation service may set the validation criteria at the front end and at the back end, and may apply the validation criteria to one or more of the inputs or other campaign data. Such coordination and variable criteria is different, for example, than non-varying front end validation criteria.

In one or more embodiments, when the unified system invalidates a content generation input, the unified system may indicate (e.g., using a user interface on a client device) that the specific input was invalid (e.g., when the input is included in a payload with other inputs, the system may indicate the invalidity of the portion of the payload that is invalid rather than indicating that the payload in general is invalid). In this manner, a user may be presented with an indication that a particular input for content generation does not satisfy a rule or criteria, and the user may re-enter or modify the input with a different value that is subsequently compared to a rule or criteria. The unified system may send inputs validated on the front end to the back end where such inputs may be evaluated after all front end inputs and other data are validated on the front end. Such validation may reduce the back-and-forth communication between the front end and the back end.

In one or more embodiments, the front end of a content generation validation service may send inputs (e.g., criteria generation inputs) to a back end of the service. The inputs may be sent using API calls using APIs provided by the validation service. The payload of the API calls may include the inputs along with indications of whether the inputs have been validated by the front end. For example, some inputs may be validated both at the front end and at the back end. Some inputs may be validated only at the front end, and some inputs may be validated only at the back end. The validation service may identify invalid inputs at the front end, and may send valid inputs and/or inputs that need to be validated at the back end to the back end.

In one or more embodiments, the back end may determine whether any inputs are invalid and may notify the front end of the specific invalid inputs, allowing the front end to prompt users to modify the invalid inputs without delaying the processing and evaluation of other inputs. Such may provide a real time validation process of content generation inputs. For example, when a user provides a campaign name input, a bid amount input, and presentation date inputs for a content campaign, the front end of the validation service may validate whether the campaign name satisfies criteria such as a number of characters and whether the campaign name begins with a capital letter. When the front end determines that the campaign name does not satisfy a front end validation criteria such as a name length, the front end may prompt the user to modify the campaign name. Once the campaign name passes front end validation, the front end may send the campaign name and other inputs (e.g., either validated by the front end or not evaluated by the front end) in an API call payload to the back end. The back end may communicate to the front end that some inputs have passed back end validation, and the front end may present a confirmation to the user (e.g., using a user interface) that the content campaign has satisfied applicable criteria and may be generated according to that criteria. When the back end determines that an input fails to satisfy a criteria (e.g., the bid amount does not satisfy a minimum or maximum bid amount), the back end may communicate to the front end that the bid amount is invalid, and the front end may present the user with an indication that the bid amount needs to be adjusted. Once the bid amount or other invalid input has been modified, sent to the back end, and validated at either or both of the front end or back end, the back end may send a confirmation to the front end that all of the inputs have been verified.

In one or more embodiments, the data schema used to determine validation criteria may provide a privacy status to identify entities (e.g., users or user accounts) that have access to validation processes (e.g., evaluations using validation criteria). The data schema may be distributed to client devices partially or entirely. As inputs are provided through an API or are provided manually, the data schema may execute validations on the front end (e.g., the front end service may validate some or all of the inputs using validation criteria) based on a privacy status or rule (e.g., as submitted to the server-side for validation of an input or property).

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates an example process 100 for using a synthetic content model verification, in accordance with one or more example embodiments of the present disclosure.

Referring to FIG. 1, the process 100 may include a device 102 for rendering content, such as applications, forms, and documents, and one or more servers 104. The device 102 and the one or more servers 104 may execute a validation service to evaluate inputs and other data received at the device 102. At step 106, the device 102 may receive content campaign inputs and other data, such as a requested content name (e.g., name1), a bid amount for the content campaign, presentation dates, user data (e.g., a customer type, a location), and other information relevant to creating a content campaign (e.g., an advertisement campaign). At step 108, the device 102 may send campaign data (e.g., received inputs such as the content name, the bid amount, the presentation date, the location) and other data (e.g., the type of user who input the data, such as the type of account or service used). At step 110, the one or more servers 104 (e.g., a back end of the validation service) may determine, based on the campaign data, validation criteria for the device 102 (e.g., for the front end of the validation service) and for the one or more servers 104 (e.g., for the back end of the validation service). At step 112, the one or more servers 104 may send the validation criteria to the device 102 (e.g., to the front end service).

Still referring to FIG. 1, at step 114, the device 102 may use first validation criteria of the validation criteria to determine that the content name (e.g., name1) fails the first validation criteria (e.g., the first validation criteria requires the content name to begin with a capital letter). In real time, the device 102 may determine the invalidity of the content name such that the device 102 may present, at step 116, an indication of the invalid content name to prompt a modification to the content name before other information is received for other inputs. At step 118, the device 102 may receive a modification to the content name (e.g., the content name may be modified from name1 to Name2), and may receive subsequent inputs. At step 120, the device 102 may determine that the content name (e.g., Name2) satisfies the first validation criteria, and that any other input received satisfies a respective validation criteria. At step 122, the device 102 may send the campaign data (e.g., as modified based on any invalidities on the front end) to the one or more servers 104 (e.g., the back end of the validation service). At step 124, the one or more servers 104 may determine that the modified campaign data satisfy respective validation criteria. At step 126, the one or more servers 104 may send an indication to the device 102 that the modified campaign data is valid (e.g., all criteria was satisfied). At step 128, the device 102 may present an indication that a content campaign will be generated according to the received inputs (e.g., parameters such as the content name, the bid amount, the presentation dates, the location, etc.).

In one or more embodiments, the validation criteria may include rules and thresholds for the front end (e.g., the device 102) and the back end (e.g., the one or more servers 104) of the validation service. The back end may use the same validation rules and thresholds for the same inputs as the front end. For example, even when the front end validates that a campaign name satisfies a minimum number of characters, the back end may evaluate the campaign name for the same minimum number of characters. The back end may evaluate an input validated on the front end using different criteria. For example, the front end may determine that the campaign name begins with a capital letter, and the back end may determine that the campaign name is not already used by another campaign in a particular location. The back end may evaluate inputs that are not evaluated on the front end, and the front end may evaluate inputs which receive no further evaluation on the back end.

In one or more embodiments, the device 102 may include a personal computer (PC), a smart home device, a device with one or more speakers or other audio outputs, a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a Blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list. The one or more servers 104 may include a remote network (e.g., a cloud-based computer network of one or more physical or virtual computers), and may be accessible by the device 102.

Figure 2:
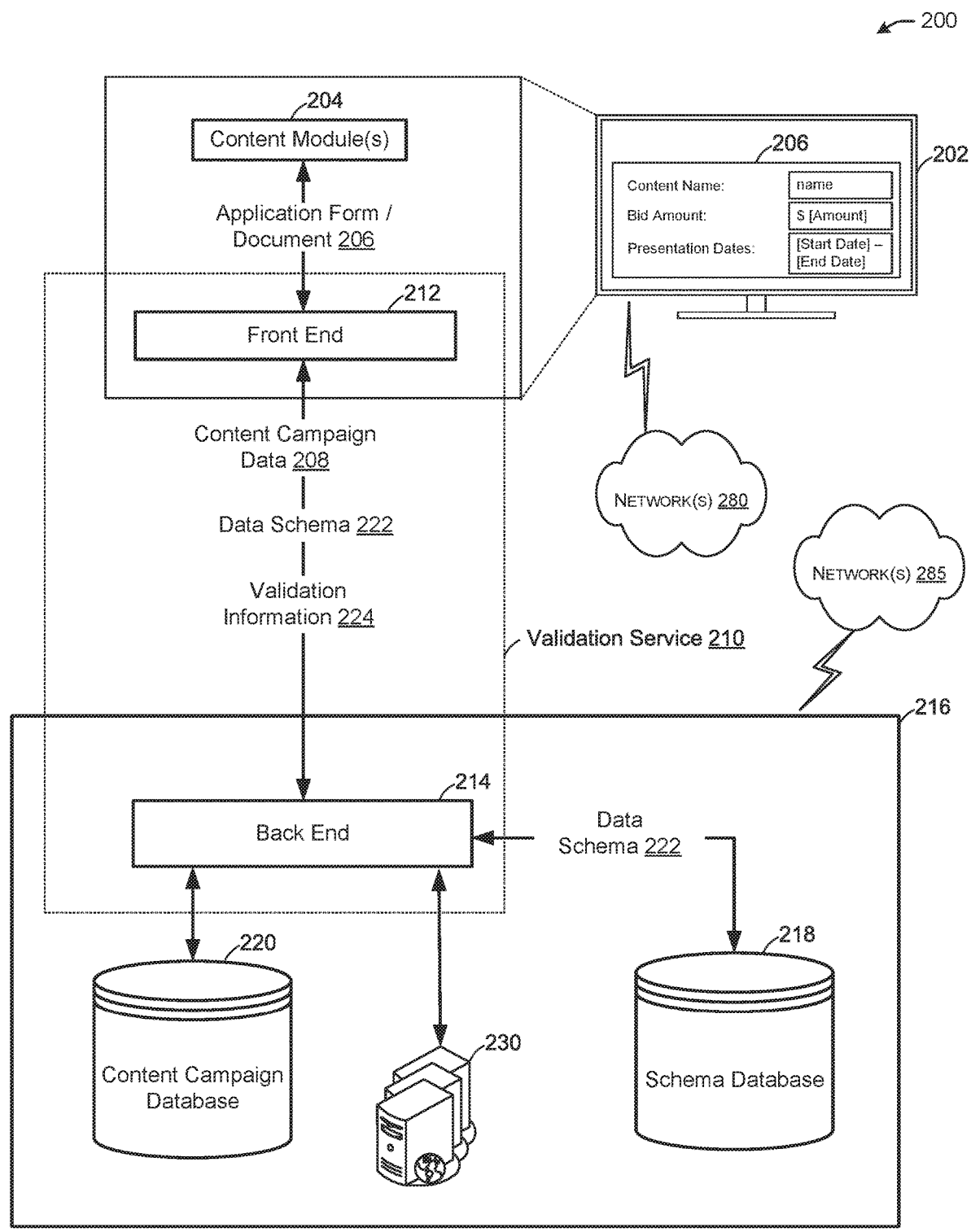
FIG. 2 illustrates a system for a synthetic content model verification, in accordance with one or more example embodiments of the present disclosure.

FIG. 2 illustrates a system 200 for using a synthetic content model verification, in accordance with one or more example embodiments of the present disclosure.

Referring to FIG. 2, the system 200 may include a device 202 (e.g., having functionality similar to the device 102 of FIG. 1), which may have one or more content modules used to display content on the device 202. The content may include an application form or document 206 (e.g., a web application form, a JavaScript Object Notation document, a user interface of an application, etc.). Information provided by the application form or document 206 may include content campaign data (e.g., the campaign data of step 108 of FIG. 1, the modified campaign data of step 122 of FIG. 1). For example, the application form or document 206 may receive inputs (e.g., content campaign parameters) such as a content campaign name, a bid amount, presentation dates, campaign location, and other relevant information. The application form or document 206 may provide additional information such as the application or interface used, the location of the device 202, the user or user profile used to generate the inputs, and other data. The content campaign data 208 may be sent (e.g., as a payload of an API call) to a validation service 210, which may include a front end service 212 (e.g., a front end of the validation service 210 executing on the device 202) and a back end service 214 (e.g., a back end of the validation service 210 executing on a remote network 216, such as a cloud-based network). The remote network 216 may include a schema database 218 (e.g., where data schema defining validation criteria for different locations, user types, applications, and the like may be stored), a content campaign database 220 (e.g., where validated content campaigns and their relative information may be stored), and one or more additional validation services 230.

Still referring to FIG. 2, the front end service 212 may receive the content campaign data 208 from the application form or document 206, and may send the content campaign data 208 (e.g., in API call payload) to the back end service 214. The validation service 210 may determine (e.g., based on the content campaign data 208 and/or user or application data) a data schema 222 to implement at the front end service 212 and/or the back end service 214. For example, the validation service 210 may determine which inputs or other data of the content campaign data 208 to evaluate on the front end service 212 and/or the back end service 214, and what validation criteria to use. The validation service 210 may communicate the validation criteria and which information to evaluate using the validation criteria to the front end service 212 and the back end service 214.

In one or more embodiments, the front end service 212 may determine, in real time, whether respective inputs of the content campaign data 208 satisfy respective validation criteria. When the front end service 212 determines that any input of the content campaign data 208 fails to satisfy a front end validation criteria (e.g., as in step 114 of FIG. 1), the front end service 212 may prompt a user to modify the invalid input (e.g., as in step 116 of FIG. 1). Once the back end service 214 has validated all data that the data schema 222 requires the front end service 212 to validate, the front end service 212 may send the content campaign data 208 to the back end service 214.

In one or more embodiments, the back end service 214 may use the same validation rules and thresholds for the same inputs as the front end service 212. For example, even when the front end service 212 validates that a campaign name satisfies a minimum number of characters, the back end service 214 may evaluate the campaign name for the same minimum number of characters. The back end service 214 may evaluate an input validated on the front end service 212 using different criteria. For example, the front end service 212 may determine that the campaign name begins with a capital letter, and the back end service 214 may determine that the campaign name is not already used by another campaign in a particular location (e.g., by searching the content campaign database 220 for a matching campaign name in existence). The back end service 214 may evaluate inputs that are not evaluated on the front end service 212, and the front end service 212 may evaluate inputs which receive no further evaluation on the back end service 214.

In one or more embodiments, the back end service 214 may determine that any input or other data of the content campaign data 208 fails to satisfy a respective criteria for content campaign generation. The back end service 214 may communicate the invalidity to the back end service 214 (e.g., using validation information 224 which indicates one or more specific inputs or other data which are invalid). In this manner, the back end service 214 may evaluate any data or input for which the data schema 222 requires back end validation before sending the validation information 224 to indicate the specific invalidities (e.g., rather than a generic indication that some information was invalid, the validation information 224 may prompt a user to modify specific information, such as in step 116 of FIG. 1). The front end service 112 may request modifications to any invalid inputs or other data, and may send received modifications of the content campaign data 208 to the back end service 214 for further evaluation. When the inputs or other data have been validated by the criteria used at the front end service 212 and/or the back end service 214, the front end service 212 may present a confirmation at the device 202 that the content campaign is to be generated according to the inputs or other data (e.g., as in step 128 of FIG. 1). The validation service 210 may store the valid content campaign and the content campaign data 208 in the content campaign database 220 for further use and evaluation.

In one or more embodiments, the validation service 210 may notify the one or more additional validation services 230 of the valid content campaign. For example, the validation service 210 may send the content campaign data 208 to the one or more additional validation services 230 so that the one or more additional validation services 230 may perform additional validation evaluations and/or may store the valid campaign information.

In one or more embodiments, the device 202 may include a personal computer (PC), a smart home device, a device with one or more speakers or other audio outputs, a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a Blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

The device 202 may be configured to communicate via a communications network 280, and the remote network 216 may be configured to communicate via a wireless communications network 285, wirelessly or wired (e.g., the same or different wireless communications networks used to provide access between the device 202 and the remote network 216). The communications network 280 and/or the communications network 285 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, the communications network 280 and/or the communications network 285 may have any suitable communication range associated therewith and may include, for example, global networks (e.g., the Internet), metropolitan area networks (MANs), wide area networks (WANs), local area networks (LANs), or personal area networks (PANs). In addition, communications network 280 and/or the communications network 285 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Figure 3:
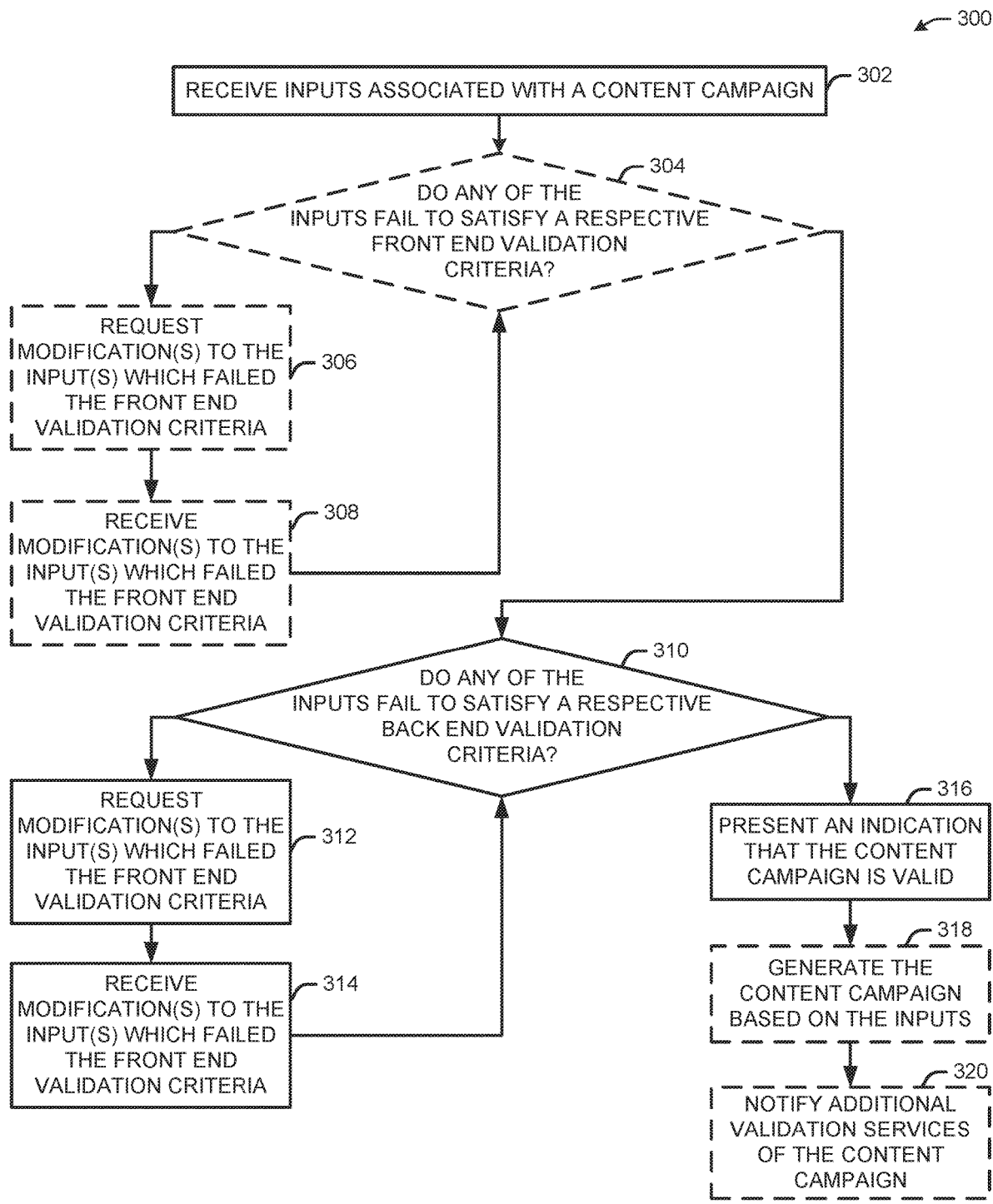
FIG. 3 illustrates a flow diagram for a process for using a synthetic content model verification, in accordance with one or more example embodiments of the present disclosure.

FIG. 3 illustrates a flow diagram for a process 300 for using a synthetic content model verification, in accordance with one or more example embodiments of the present disclosure.

At block 302, a system (e.g., the device 102 and the one or more servers 104 of FIG. 1, the validation service 210 of FIG. 2) may receive inputs or other data associated with a content campaign. For example, the system may present an interface, an application, a form, or a document into which a user may provide content campaign generation inputs, such as parameters. The inputs may include a campaign name, a bid amount, presentation dates, a location (e.g., which country or geographic area to present the campaign), and other related campaign data. The inputs may be received in one or more fields (e.g., as shown in FIG. 1, a content name input field, a bid amount input field, a presentation date input field, etc.). The fields may be separate and distinct for any input or parameter, or one input field may be used for multiple inputs.

At block 304, the system may determine whether any inputs or other campaign data fail to satisfy respective front end validation criteria. For example, the system may determine based one or more of the inputs which validation criteria to use to evaluate which inputs. A campaign name length (e.g., a minimum number of characters) may be a validation criteria. Minimum and maximum bid amounts may be validation criteria. A front end service (e.g., the front end service 212 of FIG. 2) on the system may compare one or more inputs to the validation criteria. When one or more inputs fail to satisfy respective front end validation criteria, the process 300 may continue to block 306 and to block 308. When none of the inputs fails to satisfy respective front end validation criteria, the process 300 may continue to block 310.

At block 306, the system may request modifications to respective inputs which failed to satisfy validation criteria (e.g., invalid inputs). For example, when a campaign name fails to meet a campaign name validation criteria evaluated on the front end, the system may present an indication that the respective input should be modified to meet the validation criteria (e.g. as shown in step 116 of FIG. 1). Multiple invalid inputs may be presented with indications that the invalid inputs should be modified.

At block 308, the system may receive respective modifications to the invalid inputs. For example, when a campaign name input is receive in a campaign name input field, the system may present the campaign name input field and allow a user to provide another campaign name input in the same field as a replacement of the invalid campaign name. Other input fields may be presented in the same manner, and the system may indicate both the invalidity and respective criteria to satisfy so that a user may be made aware of the criteria that respective inputs needs to satisfy in order to generate a content campaign.

At block 310, the system may send the inputs to a back end (e.g., the back end service 214 of FIG. 2) for back end validation, and the back end (e.g., operating as a same service as the front end on the device) may determine whether any of the inputs fails to satisfy respective back end validation criteria. The front end and the back end of the system may coordinate by determining which validation criteria to apply to which inputs at the front end and/or back end of the system. The back end validation criteria may be the same validation criteria for the same inputs as used at block 304, may be different validation criteria for the same inputs evaluated at block 304, and/or may be different validation criteria for different inputs than the inputs evaluated at block 304. When one or more inputs fail to satisfy respective back end validation criteria, the process 300 may continue to block 312 and to block 314. When none of the inputs fails to satisfy respective back end validation criteria, the process 300 may continue to block 316.

At block 312, the system may request modifications to respective inputs which failed to satisfy validation criteria (e.g., invalid inputs). The back end of the system may indicate to the front end of the system which inputs may be invalid. For example, when a bid amount fails to meet a bid amount validation criteria evaluated on the back end, the front end of the system may present an indication that the respective input should be modified to meet the validation criteria (e.g. as shown in step 116 of FIG. 1). Multiple invalid inputs may be presented with indications that the invalid inputs should be modified.

At block 314, the system may receive respective modifications to the invalid inputs. For example, when a bid amount input is receive in a bid amount input field, the system may present at the front end the bid amount input field and allow a user to provide another bid amount input in the same field as a replacement of the invalid bid amount. Other input fields may be presented in the same manner, and the system may indicate both the invalidity and respective criteria to satisfy so that a user may be made aware of the criteria that respective inputs needs to satisfy in order to generate a content campaign. The front end may send any inputs, including the modified/replacement inputs, to the back end, and the back end may evaluate any of the inputs using back end validation criteria until there are no invalid inputs detected by the system.

At block 316, the system may indicate on the front end that the content campaign is valid and may be generated according to the validated inputs. The back end of the system may indicate to the front end of the system that there are no invalid inputs on the back end, and the front end may present a confirmation of the validity of the campaign inputs provided by a user.

At block 318, the system may generate the content campaign or send the content campaign to another system for generation. For example, using the inputs and other campaign data received, the system or another system may generate content such as advertisements, and may present the advertisements in certain locations and on certain dates as specified by the inputs. The inputs may indicate the content to be presented or criteria with which the system or another system may select criteria to include in one or more advertisements of a campaign.

At block 320, the system may notify additional systems (e.g., the one or more additional validation services 230 of FIG. 230). The additional systems may perform the same and/or additional content validation using the same or different criteria.

Figure 4:
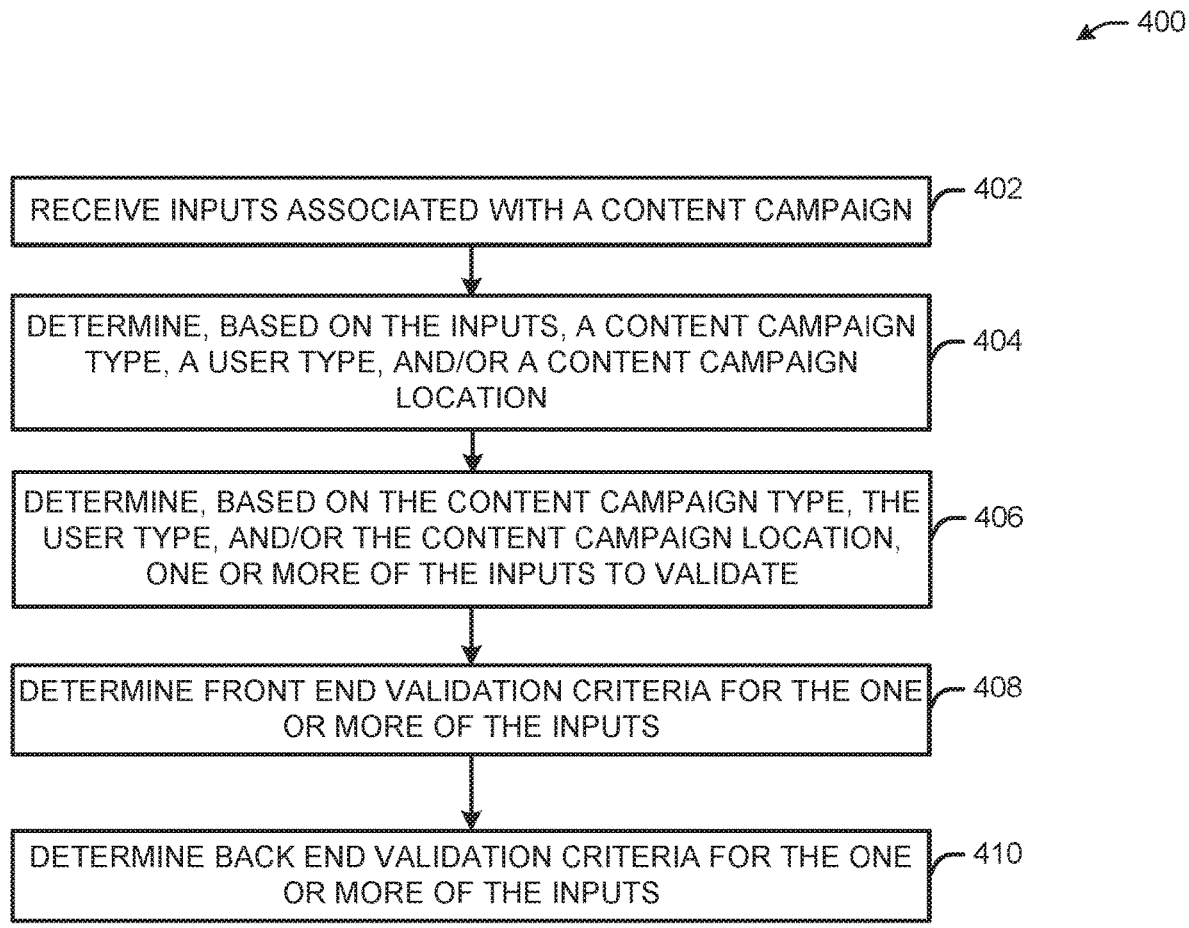
FIG. 4 illustrates a flow diagram for a process for using a synthetic content model verification, in accordance with one or more example embodiments of the present disclosure.

FIG. 4 illustrates a flow diagram for a process 400 for using a synthetic content model verification, in accordance with one or more example embodiments of the present disclosure.

At block 402, a system (e.g., the device 102 and the one or more servers 104 of FIG. 1, the validation service 210 of FIG. 2) may receive inputs or other data associated with a content campaign. For example, the system may present an interface, an application, a form, or a document into which a user may provide content campaign generation inputs, such as parameters. The inputs may include a campaign name, a bid amount, presentation dates, a location (e.g., which country or geographic area to present the campaign), and other related campaign data. The inputs may be received in one or more fields (e.g., as shown in FIG. 1, a content name input field, a bid amount input field, a presentation date input field, etc.). The fields may be separate and distinct for any input or parameter, or one input field may be used for multiple inputs.

At block 404, the system may determine, based on the inputs and/or other data, a content campaign type, data identifying the user providing the inputs, the type of user or user account, the type of application used to receive the inputs, the location of the user, the location for presenting the content campaign, and the like. The inputs may provide such data, or the data may be identified based on the device used to receive the inputs, the user account used to supply the inputs, or other device or account data.

At block 406, the system may determine, based on the data identifying the user providing the inputs, the type of user or user account, the type of application used to receive the inputs, the location of the user, and/or the location for presenting the content campaign, one or more inputs of the inputs that the system is to validate at a front end (e.g., the front end service 212 of FIG. 2) and/or a back end (e.g., the back end service 214 of FIG. 2). All or a subset of the inputs may require validation at some combination of the front end and/or the back end.

At block 408, the system may determine the front end validation criteria for one or more of the inputs. The front end may validate none of the inputs, a subset of the inputs, or all of the inputs. Any input may be validated using one or more validation criterion. For example, the front end may validate whether a campaign name meets a minimum number of characters and whether the campaign name begins with a capital letter. The front end may validate whether a bid amount satisfies a minimum and/or maximum bid amount (e.g., satisfies a budget rule).

At block 410, the system may determine the back end validation criteria for one or more of the inputs. The back end may validate none of the inputs, a subset of the inputs, or all of the inputs. Any input may be validated using one or more validation criterion. The back end validation criteria may be the same criteria as used at the front end for the same inputs validated at the front end (e.g., repeat validation), may be different criteria than the criteria used at the front end for the same inputs validated at the front end, or may be different criteria for different inputs than the inputs validated at the front end. For example, the back end may have access to campaign names for existing campaigns, and may verify that a campaign name input is not already in use.

Referring to FIG. 3 and FIG. 4, the blocks of FIG. 4 may be implemented prior to the block 304 and/or the block 310 of FIG. 3 so that the front end and the back end have respective validation criteria to use to evaluate the validity of campaign inputs or other data.

Figure 5:
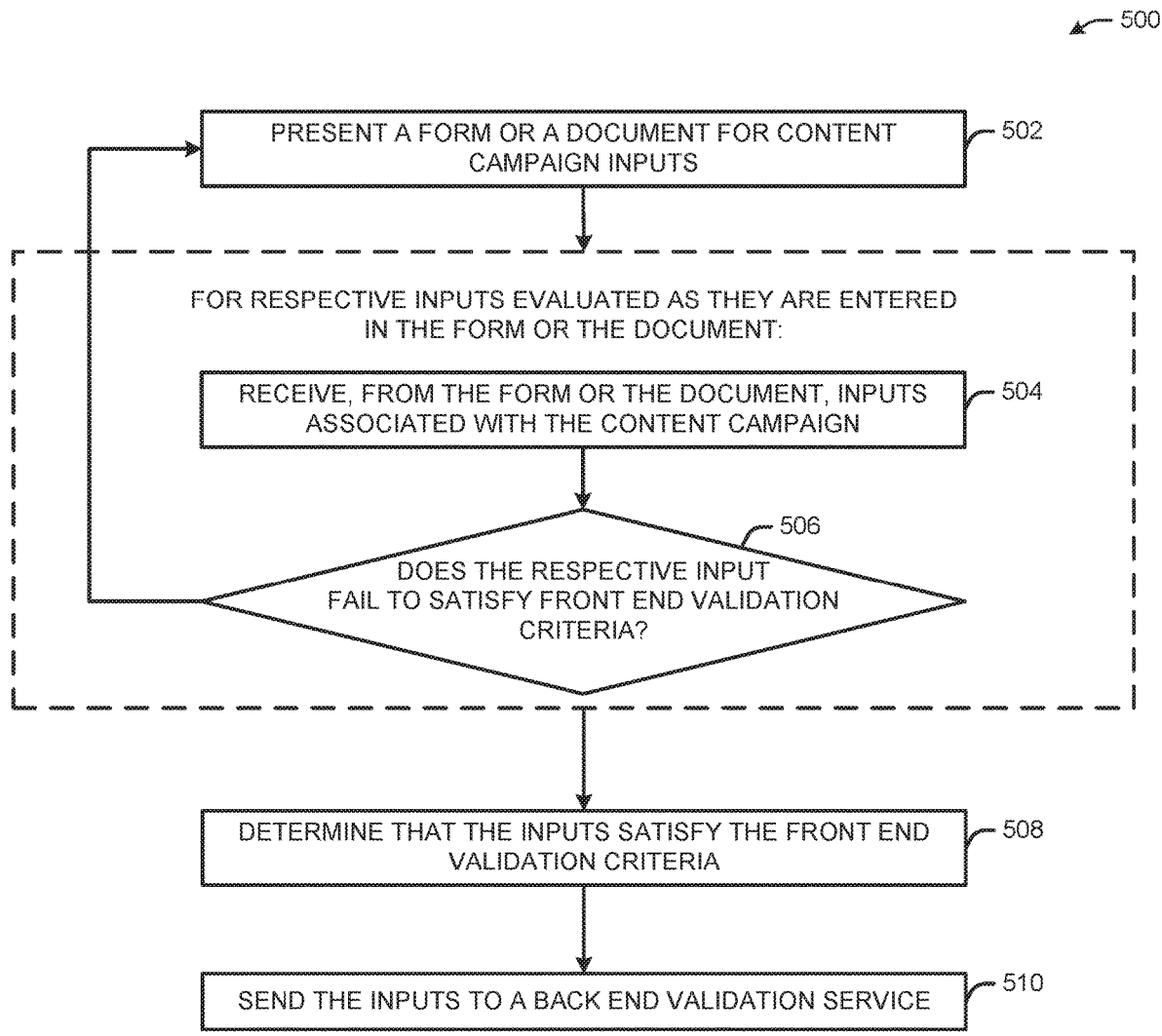
FIG. 5 illustrates a flow diagram for a process for using a synthetic content model verification, in accordance with one or more example embodiments of the present disclosure.

FIG. 5 illustrates a flow diagram for a process 500 for using a synthetic content model verification, in accordance with one or more example embodiments of the present disclosure.

At block 502, a system (e.g., the device 102 and the one or more servers 104 of FIG. 1, the validation service 210 of FIG. 2) may present a form or a document for receiving content campaign inputs (e.g., as shown in step 106 of FIG. 1). The form or document may be presented at a front end (e.g. the front end service 212 of FIG. 2) using a user interface or some other presentable form or executable application (e.g., the application form/document 206 of FIG. 2). The form or document may include one or multiple input fields in which a user may provide respective inputs or other data (e.g., campaign parameters).

At block 504, for any inputs requiring front end validation (e.g., as determined at block 408 of FIG. 4) the system may receive respective inputs or other data associated with a content campaign. For example, the system may present an interface, an application, a form, or a document into which a user may provide content campaign generation inputs, such as parameters. The inputs may include a campaign name, a bid amount, presentation dates, a location (e.g., which country or geographic area to present the campaign), and other related campaign data. The inputs may be received in one or more fields (e.g., as shown in FIG. 1, a content name input field, a bid amount input field, a presentation date input field, etc.). The fields may be separate and distinct for any input or parameter, or one input field may be used for multiple inputs. Respective inputs may be evaluated in real time. In such a manner, the system may indicate whether any respective input is invalid before sending inputs to a back end (e.g., the back end service 214 of FIG. 2).

At block 506, for any inputs requiring front end validation (e.g., as determined at block 408 of FIG. 4) the system may determine whether the respective input satisfies front end validation criteria. When a respective input fails to satisfy front end validation criteria, the process 500 may continue to block 508, where the system may present an annotated form or annotated document (e.g., a version of the form or document of block 502, but with one or more indications of the specific inputs which failed to satisfy validity criteria, such as is shown in step 116 of FIG. 1). The replacement/modified inputs may be received at 504 and further evaluated until all inputs requiring front end validation have been validated at the front end, or until a threshold number of inputs have satisfied front end validation. Once all or a subset of inputs to be validated at the front end have been validated at the front end, the process 500 may continue at block 510.

At block 510, the system may determine that the front end validation criterion have been satisfied. Either all or a subset of inputs may satisfy respective front end validation criteria before the system sends the inputs to a back end validation service (e.g., the back end service 214 of FIG. 2). For example, the inputs may be sent as a payload of an API call using an API provided by the back end.

Figure 6:
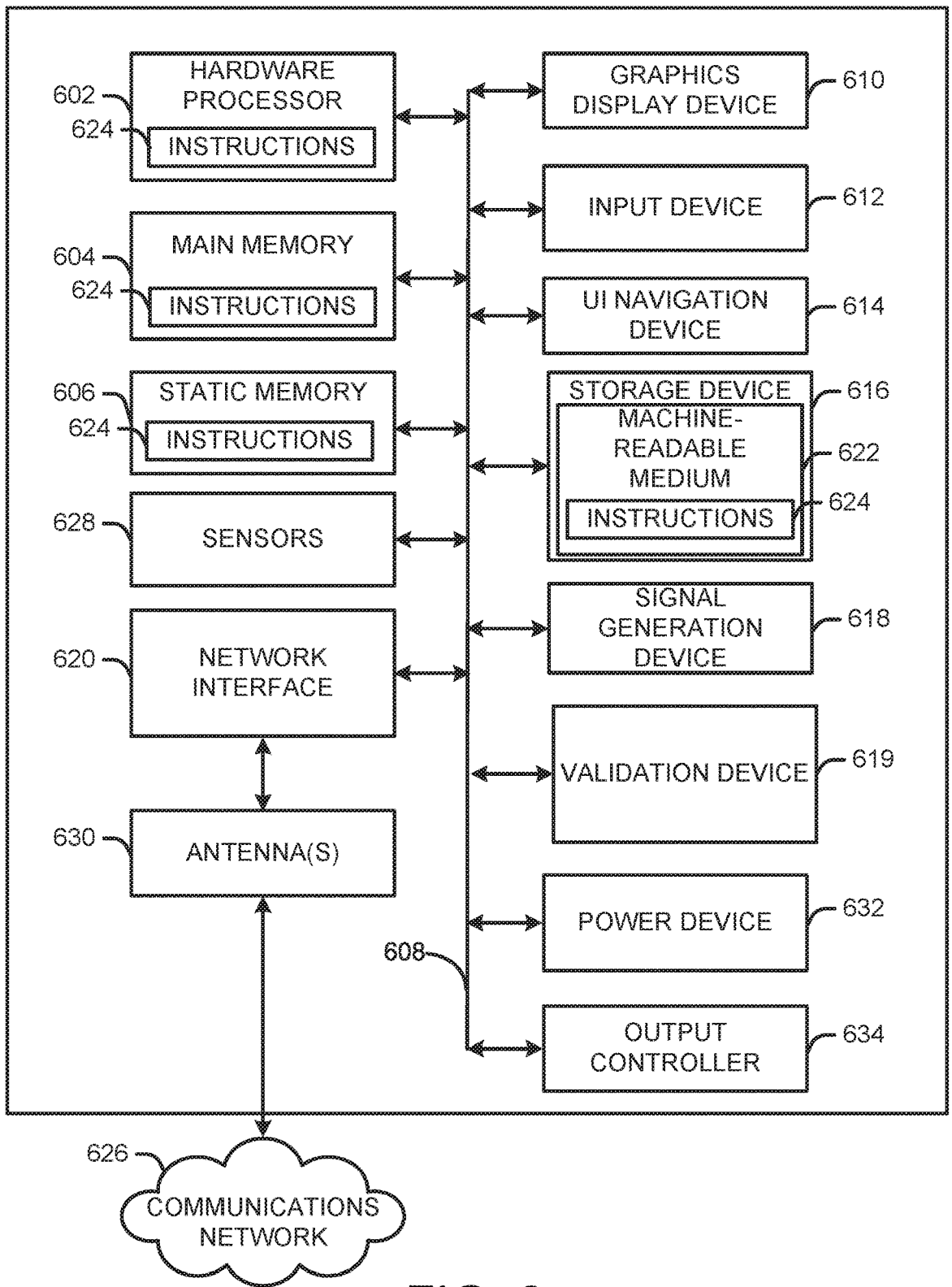
FIG. 6 illustrates a block diagram of an example machine upon which any of one or more techniques (e.g., methods) may be performed, in accordance with one or more example embodiments of the present disclosure.

FIG. 6 illustrates a block diagram of an example of a machine 600 (e.g., the device 102 of FIG. 1, the one or more servers 104 of FIG. 1, the device 202 of FIG. 2, the validation service 210 of FIG. 2, the remote network 216 of FIG. 2) or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in Wi-Fi direct, peer-to-peer (P2P), cellular, (or other distributed) network environments. The machine 600 may be a server, a personal computer (PC), a smart home device, a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618, a validation device 619, a network interface device/transceiver 620 coupled to antenna(s) 630, and one or more sensors 628, such as a global positioning system (GPS) sensor, a compass, an accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

The validation device 619 may carry out or perform any of the operations and processes (e.g., process 300 of FIG. 3, process 400 of FIG. 4, process 500 of FIG. 5) described and shown above.

In one or more embodiments, the validation device 619 may be implemented as part of a remote network (e.g., the one or more servers 104 of FIG. 1, the remote network 216 of FIG. 2) or as part of a device which renders content (e.g., the device 102 of FIG. 1, device 202 of FIG. 2). The validation device 619 may represent a validation service with front end and back end service capability (e.g., the validation service 210 of FIG. 2). For example, the validation device 619 may include a front end service and a back end service (e.g., the machine 600 on the client side may include the validation device 619 functioning as a front end service, and the machine 600 on the server side may include the validation device 619 functioning as a back end service).

In one or more embodiments, rather than having multiple front end and back end system validations performed on one set of content generation inputs, the validation device 619 may validate the inputs and notify other validation systems of the inputs. The validation device 619 may provide users with opportunities to modify inputs that are invalid (e.g., do not meet criteria), and may evaluate and allow input modifications in real time. Real-time front-end evaluation of inputs and other data related to a content campaign may allow for a front end validation service to verify that any inputs or other data that may be validated on the front end are validated on the front end before sending the inputs or other data to the back end. In this manner, the number of communications between the front end and the back end may be reduced.

In one or more embodiments, the validation device 619 may use front end validation and back end validation, or may skip front end validation by sending all data inputs for content generation to the back end for server side validation. To avoid the back-and-forth calls between the front end and back end to determine and confirm that the content generation inputs are valid, the inputs may be evaluated in real time. For example, the front end may determine that data input for any criteria (e.g., name, bid amount, presentation dates, etc.) is valid or invalid while the user is inputting other data. In this manner, the front end does not need to send to the back end all of the inputs, and the back end does not need to respond with a valid or invalid indication for the entire set of inputs. Instead, the front end may indicate an invalid input before sending the input to the back end, or may send the input to the back end while the user is still inputting other criteria for content generation via a user interface (e.g., the data inputted into the user interface may be sent in an API payload to the back end for further evaluation).

In one or more embodiments, the validation device 619 may determine validation criteria for the front end and the back end based on variables such as a type of user requesting the content campaign, a location of the requesting user, a location where the content campaign is to be presented, and other data related to the content campaign or the requesting user. For example, the front end may validate whether a minimum bid amount is satisfied before the bid amount received at the front end is sent to the back end with any other inputs or relevant campaign data. For the front end to apply the minimum bid amount criteria, the front end and the back end of the validation service may coordinate to determine which validation criteria to apply. For example, when a content campaign location is in one country, the front end minimum bid amount validation criteria (e.g., a minimum bid threshold) may be different than the front end minimum bid amount validation criteria for a content campaign in another country. In this manner, the front end may send the inputs and other campaign data to the back end, which may identify the validation criteria (e.g., a data schema) applicable to the country identified by an input. Accordingly, the validation device 619 may set the validation criteria at the front end and at the back end, and may apply the validation criteria to one or more of the inputs or other campaign data. Such coordination and variable criteria is different, for example, than non-varying front end validation criteria.

In one or more embodiments, when the validation device 619 invalidates a content generation input, the validation device 619 may indicate (e.g., using a user interface on a client device) that the specific input was invalid (e.g., when the input is included in a payload with other inputs, the system may indicate the invalidity of the portion of the payload that is invalid rather than indicating that the payload in general is invalid). In this manner, a user may be presented with an indication that a particular input for content generation does not satisfy a rule or criteria, and the user may re-enter or modify the input with a different value that is subsequently compared to a rule or criteria. The validation device 619 may send inputs validated on the front end to the back end where such inputs may be evaluated after all front end inputs and other data are validated on the front end. Such validation may reduce the back-and-forth communication between the front end and the back end.

In one or more embodiments, the front end of the validation device 619 may send inputs (e.g., criteria generation inputs) to a back end of the service. The inputs may be sent using API calls using APIs provided by the validation service. The payload of the API calls may include the inputs along with indications of whether the inputs have been validated by the front end. For example, some inputs may be validated both at the front end and at the back end. Some inputs may be validated only at the front end, and some inputs may be validated only at the back end. The validation device 619 may identify invalid inputs at the front end, and may send valid inputs and/or inputs that need to be validated at the back end to the back end.

In one or more embodiments, the back end validation device 619 may determine whether any inputs are invalid and may notify the front end of the specific invalid inputs, allowing the front end validation device 619 to prompt users to modify the invalid inputs without delaying the processing and evaluation of other inputs. Such may provide a real time validation process of content generation inputs. For example, when a user provides a campaign name input, a bid amount input, and presentation date inputs for a content campaign, the front end validation device 619 may validate whether the campaign name satisfies criteria such as a number of characters and whether the campaign name begins with a capital letter. When the front end determines that the campaign name does not satisfy a front end validation criteria such as a name length, the front end may prompt the user to modify the campaign name. Once the campaign name passes front end validation, the front end may send the campaign name and other inputs (e.g., either validated by the front end or not evaluated by the front end) in an API call payload to the back end. The back end validation device 619 may communicate to the front end that some inputs have passed back end validation, and the front end may present a confirmation to the user (e.g., using a user interface) that the content campaign has satisfied applicable criteria and may be generated according to that criteria. When the back end determines that an input fails to satisfy a criteria (e.g., the bid amount does not satisfy a minimum or maximum bid amount), the back end may communicate to the front end that the bid amount is invalid, and the front end may present the user with an indication that the bid amount needs to be adjusted. Once the bid amount or other invalid input has been modified, sent to the back end, and validated at either or both of the front end or back end, the back end may send a confirmation to the front end that all of the inputs have been verified.

It is understood that the above are only a subset of what the validation device 619 may be configured to perform and that other functions included throughout this disclosure may also be performed by the validation device 619.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method comprising:
receiving, at a front end service of an application associated with a device, a first input and a second input associated with a content campaign;
determining, based on the first input and the second input, first validation criteria and second validation criteria;
determining, by the front end service, that the first input fails to satisfy the first validation criteria;
presenting, at the device, a first indication that the first input fails to satisfy the first validation criteria;
receiving, at the front end service, third input replacing the first input;
determining, by the front end service, that the third input satisfies the first validation criteria;
determining, by the front end service, that all front end criteria have been satisfied by the second input;
sending, by the front end service in a first application programming interface (API) call to a back end service of the application, prior to a determination that all front end criteria have been satisfied by the third input and based on the determination that all front end criteria have been satisfied by the second input, the second input and the third input;
determining, by the back end service, prior to a determination that all front end criteria have been satisfied by the third input, that the second input satisfies the second validation criteria;
receiving, by the front end service from the back end service, a second indication that the second input satisfies the second validation criteria; and
presenting, at the device, a third indication that the content campaign is to be generated using the third input and the second input.

2. The method of claim 1, further comprising determining, based on the content campaign, front end validation criteria and back end validation criteria, wherein the first validation criteria is different than the second validation criteria.

3. The method of claim 1, wherein the first input is a content campaign name, determining that the first input fails to satisfy the first validation criteria comprises determining that the content campaign name fails to satisfy a minimum number of content campaign name characters, further comprising:
determining, by the back end service, that the content campaign name fails to match an existing content campaign name; and
receiving, by the front end service from the back end service, a fourth indication that the content campaign name satisfies a third validation criteria.

4. A method, comprising:
receiving, at a front end service of an application associated with a device, inputs associated with a content campaign, the inputs comprising a first input and a second input;
determining, based on the inputs, validation criteria comprising first validation criteria, second validation criteria, and third validation criteria;
determining, by the front end service, that the second input satisfies the first validation criteria;
sending, by the front end service in a payload of a first application programming interface (API) call to a back end service of the application remote from the device, prior to the front end service determining that the first input satisfies the first validation criteria and based on the determination that the second input satisfies the first validation criteria, the second input and the first input;

receiving, by the front end service from the back end service, a first indication that the second input fails to satisfy the third validation criteria;

receiving, at the front end service, a third input, wherein the third input replaces the second input;

sending, by the front end service in a payload of a third API call to the back end service, the third input;

receiving, by the front end service from the back end service, a second indication that the third input satisfies the third validation criteria; and presenting, at the device, a third indication that the content campaign is to be generated.

5. The method of claim 4, wherein determining the validation criteria comprises:

determining that the first validation criteria and the second validation criteria are associated with the front end service; and determining that the third validation criteria is associated with the back end service.

6. The method of claim 4, wherein the second input is received from an input field, further comprising presenting, at the device, a request to modify the first input, wherein the third input is received from the input field.

7. The method of claim 4, further comprising determining, by the back end service, that the first input satisfies a fourth validation criteria, wherein the first validation criteria is different than the fourth validation criteria.

8. The method of claim 4, further comprising determining, by the back end service, that the first input satisfies the first validation criteria.

9. The method of claim 4, wherein the front end service and the back end service are associated with a first validation service, further comprising sending the inputs to a second validation service.

10. The method of claim 4, further comprising determining that all front end validation criteria has been satisfied by the first input, wherein the front end validation criteria comprises the first validation criteria and the second validation criteria, and wherein sending the first input and the second input is based on determining that all front end validation criteria has been satisfied by the first input.

11. The method of claim 4, further comprising generating the content campaign based on the determination that the first input satisfies the first validation criteria and based on the determination that the third input satisfies the third validation criteria.

12. The method of claim 4, further comprising determining that a subset of the inputs are to be validated prior to generation of the content campaign, the subset comprising the first input, the second input, and the third input.

13. The method of claim 4, further comprising:

determining that a fourth input of the inputs fails to satisfy the second validation criteria;

presenting, at the device, a request to modify the fourth input; and receiving a fifth input of the inputs, wherein the request is presented before receiving the fifth input.

14. A system comprising memory coupled to at least one processor, the at least one processor configured to:

receive, at a front end service of an application of a device, inputs associated with a content campaign, the inputs comprising a first input and a second input;

determine, based on the inputs, validation criteria comprising first validation criteria, second validation criteria, and third validation criteria;

determine, by the front end service, that the second input satisfies the first validation criteria;

send, by the front end service in a payload of a first application programming interface (API) call to a back end service of the application remote from the device, prior to the front end service determining that the first input satisfies the first validation criteria and based on the determination that the second input satisfies the first validation criteria, the second input and the first input;

receive, by the front end service from the back end service, a first indication that the second input fails to satisfy a third validation criteria;

receive, at the front end service, a third input, wherein the third input replaces the second input;

send, by the front end service in a payload of a third API call to the back end service, the third input;

receive, by the front end service from the back end service, a second indication that the third input satisfies the third validation criteria; and present, at the system, a third indication that the content campaign is to be generated.

15. The system of claim 14, wherein to determine the validation criteria comprises the at least one processor being further configured to:

determine that the first validation criteria and the second validation criteria are associated with the front end service; and determine that the third validation criteria is associated with the back end service.

16. The system of claim 14, wherein the second input is received from an input field, wherein the at least one processor is further configured to present, at the system, a request to modify the first input, and wherein the third input is received from the input field.

17. The system of claim 14, wherein the at least one processor is further configured to determine, by the back end service, that the first input satisfies a fourth validation criteria, and wherein the first validation criteria is different than the fourth validation criteria.

18. The method of claim 4, wherein the first indication that the second input fails to satisfy the third validation criteria is received by the front end service prior to the front end service determining that the first input satisfies the first validation criteria.

19. The method of claim 4, wherein sending the second input from the front end service to the back end service occurs prior to a comparison of the second input to the validation criteria.

20. The system of claim 14, wherein the first indication that the second input fails to satisfy the third validation criteria is received by the front end service prior to the front end service determining that the first input satisfies the first validation criteria.

* * * * *